United States Patent
Miyazaki et al.

(10) Patent No.: US 6,912,512 B2
(45) Date of Patent: *Jun. 28, 2005

(54) DIGITAL CONTENTS DISTRIBUTION SYSTEM CAPABLE OF FLEXIBLY CHANGING USING CONDITIONS

(75) Inventors: Kazuya Miyazaki, Tokyo (JP); Harumitsu Nakajima, Tokyo (JP); Tetsuo Nakakawaji, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 594 days.

(21) Appl. No.: 09/131,386

(22) Filed: Aug. 7, 1998

(65) Prior Publication Data

US 2001/0044780 A1 Nov. 22, 2001

(30) Foreign Application Priority Data

Sep. 11, 1997 (JP) .............................................. 9-246752

(51) Int. Cl.$^7$ ................................................ G06F 17/60
(52) U.S. Cl. ........................................................ 705/51
(58) Field of Search ............................... 380/4; 283/72; 705/69, 54, 53, 51; 713/200

(56) References Cited

U.S. PATENT DOCUMENTS

| | | | | |
|---|---|---|---|---|
| 5,354,097 A | * | 10/1994 | Tel ................................ | 283/72 |
| 5,557,518 A | * | 9/1996 | Rosen ............................ | 705/69 |
| 5,564,038 A | | 10/1996 | Grantz et al. | |
| 5,579,479 A | | 11/1996 | Plum | |
| 5,629,980 A | * | 5/1997 | Stefik et al. ..................... | 380/4 |
| 5,818,933 A | * | 10/1998 | Kambe et al. ................. | 705/57 |
| 5,848,158 A | * | 12/1998 | Saito et al. ..................... | 705/54 |
| 5,892,900 A | * | 4/1999 | Ginter et al. ................ | 713/200 |
| 5,903,650 A | * | 5/1999 | Ross et al. ...................... | 705/59 |
| 5,923,754 A | * | 7/1999 | Angelo et al. ................. | 705/54 |
| 5,991,876 A | * | 11/1999 | Johnson et al. .............. | 713/200 |
| 6,006,332 A | * | 12/1999 | Rabne et al. ................ | 713/200 |

FOREIGN PATENT DOCUMENTS

JP           9114786           5/1997

OTHER PUBLICATIONS

Bruce Schneier. "Applied Cryptography" 2d. (New York: John Wiley & Sons, Inc., ) pp. 30–31, Jan. 1, 1996.*

* cited by examiner

Primary Examiner—John Leonard Young
(74) Attorney, Agent, or Firm—Birch, Stewart, Kolasch & Birch, LLP.

(57) ABSTRACT

A digital contents distribution system that generates first execution verify logic, second execution verify logic and execution verify logic conversion software. The first execution verify logic and second execution verify logic each carry out the verification and execution control of contents, and the first execution verify logic is linked with the contents at first. The execution verify logic conversion software includes execution verify logic converter for replacing the first execution verify logic with the second execution verify logic to relink the latter with the contents. A user terminal is provided with the contents linked with the first execution verify logic, and the execution verify logic conversion software.

20 Claims, 11 Drawing Sheets

DIGITAL CONTENTS DISTRIBUTION SYSTEM CAPABLE OF FLEXIBLY CHANGING USING CONDITIONS

BACKGROUND OF THE INVENTION

1. Field of the Invention

The present invention relates to a digital contents distribution system for vending digital contents on an open wide-area network such as the Internet, and particularly to a digital contents distribution system that can implement the copyright management and charge management of the vended digital contents, and prevent the piracy thereof.

2. Description of Related Art

FIG. 16 is a block diagram showing a conventional digital contents distribution system disclosed in Japanese patent application laid-open No. 8-6784/1996, for example. In FIG. 16, the reference numeral 101 designates a user terminal; 102 designates use control means; 103 designates locking/destroying processing means; 104 designates software/copyrightable works; 105 designates continued use request processing means; 106 designates unlocking/reusing processing means; 107 designates management equipment of a distributor (vendor); 108 designates user information management means; 109 designates capability examination processing means; and 110 designates license renewal processing means.

Next, the operation of the conventional digital contents distribution system will be described.

The software/copyrightable works 104 embedding the locking/destroying processing means 103 are transmitted together with a key to the user terminal 101 of a vendee through a communication channel. The user terminal 101 exploits the software by unlocking it using the key. The software or work is automatically locked or destroyed on the expiration date in order to stop its operation. If the user sends a request for the continued use to the management equipment 107 through the continued use request processing means 105, the capability examination processing means 109 makes a decision referring to the contents of the user information management means 108, and the license renewal processing means 110 transmits, unless there is any problem, a new key or product to the user terminal 101 via a communication channel. The user terminal 101 receives the key or the product, and continues using the software or product until the next expiration date by unlocking it with the unlocking/reusing processing means 106.

With the foregoing configuration, the conventional digital contents distribution system has a problem of strictly restricting not only the expiration date, but also a range of available functions and data that can be referred to, and hence of being unable to generate a trial-use version of the contents by flexibly designating them.

Furthermore, since the conventional digital contents distribution system takes little care of an author, it has a problem in that it cannot provide a structure or processing flow that readily enables the author to manage the copyright, and a distributor to manage the charge.

In addition, since the distributor manages the encryption key of the digital contents in the conventional digital contents distribution system, the author must commit his or her product entirely to the custody of the distributor.

Moreover, the conventional digital contents distribution system has a problem of paying little attention to the embedding of user information into the digital contents, or the embedding is committed to the intention of the user.

Finally, the conventional digital contents distribution system has a problem in that since the charge timing is concurrent with the provision of the digital contents or decryption key, the user is apt to refuse it.

SUMMARY OF THE INVENTION

The present invention is implemented to solve the foregoing problems. It is therefore an object of the present invention to provide a digital contents distribution system that can generate a trial-use version of the contents which enables available conditions or functions to be set flexibly.

Another object of the present invention is to provide a digital contents distribution system capable of implementing copyright protection without imposing too much burden on an author, in a configuration including a copyright management agency.

Still another object of the present invention is to provide a digital contents distribution system capable of implementing digital watermarking; digital signature, encryption and integration of execution verify logic without complicated procedure.

Another object of the present invention is to provide a digital contents distribution system capable of making it difficult for a distributor to learn the key of the contents.

Still another object of the present invention is to provided a digital contents distribution system that can inseparably embed precise user information into the contents without any complicated procedure, and can prevent unauthorized copy or distribution thereof.

Another object of the present invention is to provide a digital contents distribution system that makes it possible for the distributor to acquire charge information at a time when the user carries out processing for enabling the digital contents.

According to a first aspect of the present invention, there is provided a digital contents distribution system comprising: a digital contents distribution center that distributes digital contents; at least one user terminal that receives the digital contents; and an information transmission medium that interconnects the digital contents distribution center and the user terminal, wherein the digital contents distribution center comprises: link means for generating a first execution verify logic that carries out verification and execution control of the digital contents, and for linking the first execution verify logic with the digital contents; and execution verify logic conversion software generating means for generating a second execution verify logic that carries out verification and execution control of the digital contents, and for generating execution verify logic conversion software for replacing the first execution verify logic linked to the digital contents with the second execution verify logic to form a new linkage of the digital contents and the second execution verify logic, wherein the digital contents distribution center provides the user terminal with at least part of the execution verify logic conversion software and the digital contents linked with the first execution verify logic, via the information transmission medium.

Here, the second execution verify logic may have less severe execution restrictions than the first execution verify logic.

The digital contents distribution center may provide the user terminal with the execution verify logic conversion software and the digital contents linked with the first execution verify logic, via a communication channel.

The link means may comprise: contents key generating means for generating a contents key for encrypting at least part of the digital contents; contents encrypting means for encrypting at least part of the digital contents using the contents key generated by the contents key generating means; digital watermarking means for inseparably incorporating predetermined information into the digital contents using digital watermarking; digital signature generating means for generating a digital signature of the digital contents; first identifier generating means for generating a hash value of the first execution verify logic as a first message identifier; and contents link means for linking the digital signature, the first execution verify logic and the first message identifier with the digital contents which have been encrypted at least in part by the contents encrypting means, and undergone digital watermarking by the digital watermarking means.

The execution verify logic conversion software generating means may comprise: encrypted contents management means for managing, in connection with the contents key, the first message identifier of the digital contents encrypted by the contents encrypting means; second identifier generating means for generating a hash value of the second execution verify logic as a second message identifier; and second execution verify logic generating means for generating the second execution verify logic in accordance with its specifications transmitted from the digital contents distribution center; and conversion software generating means for generating execution verify logic conversion software for replacing the first execution verify logic with the second execution verify logic generated by the second execution verify logic generating means.

The second execution verify logic may comprise: digital signature verify means for verifying digital signature of the digital contents; identifier verify means for verifying the second message identifier; contents key storage means for storing the contents key; contents key storage decision means for making a decision whether the contents key is stored in the contents key storage means; and decrypting means for decrypting, using the contents key, the digital contents which have been encrypted, when the contents key is stored in the contents key storage means.

The contents key storage means may store the contents key which has been encrypted using a public key of a user to whom the digital contents are to be distributed.

The second execution verify logic may comprise private key acquisition means for acquiring a private key of the user, wherein the decrypting means may decrypt, using the private key of the user, the contents key stored in the contents key storage means, and decrypt, using the contents key decrypted, the digital contents encrypted by the contents encrypting means.

The execution verify logic conversion software may comprise user information embedding means for embedding user information into the digital contents using digital watermarking.

The execution verify logic conversion software may comprise charge information providing means for transmitting charge information to the digital contents distribution center via the information transmission medium, when the first execution verify logic is changed to the second execution verify logic.

According to a second aspect of the present invention, there is provided a digital contents distribution system comprising: an author terminal of an author who creates digital contents; a copyright management agency, serving as a deputy of the author, for carrying out copyright management of the digital contents the author creates; a digital contents distribution center that distributes the digital contents; at least one user terminal that receives the digital contents; and an information transmission medium that interconnects the author terminal, the copyright management agency, the digital contents distribution center and the user terminal, wherein the author terminal comprises link means for generating first execution verify logic that carries out verification and execution control of the digital contents, and for linking the first execution verify logic with the digital contents, wherein the copyright management agency comprises execution verify logic conversion software generating means for generating a second execution verify logic in accordance with specifications of the second execution verify logic transmitted from the digital contents distribution center, and for generating execution verify logic conversion software for replacing the first execution verify logic with the second execution verify logic, and wherein the digital contents distribution center comprises specifications generating means for generating the specifications of the second execution verify logic, and compare and verify means for comparing the second execution verify logic, which is included in the execution verify logic conversion software transmitted from the copyright management agency, with the specifications of the second execution verify logic, which are generated in the digital contents distribution center, to verify the second execution verify logic, and wherein the digital contents distribution center provides the user terminal with at least part of the execution verify logic conversion software and the digital contents linked with the first execution verify logic, via the information transmission medium.

DETAILED DESCRIPTION OF THE PREFERRED EMBODIMENTS

The invention will now be described with reference to the accompanying drawings.

Embodiment 1

Figure 1:
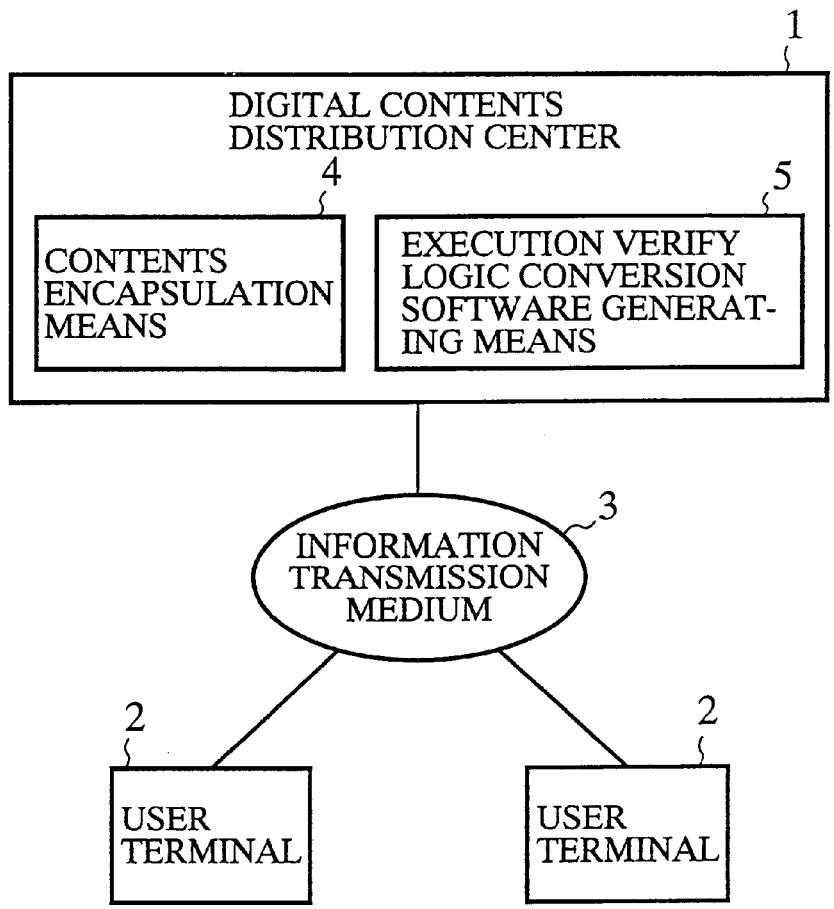
FIG. 1 is a block diagram showing the entire configuration of an embodiment 1 of a digital contents distribution system in accordance with the present invention.

FIG. 1 is a block diagram showing the entire configuration of an embodiment 1 of a digital contents distribution system in accordance with the present invention. In FIG. 1, the reference numeral 1 designates a digital contents distribution center for distributing the digital contents; each reference numeral 2 designates a user terminal for receiving the digital contents to exploit them; 3 designates an information transmission medium interconnecting the digital contents distribution center 1 with user terminals 2 for conveying information; 4 designates contents encapsulation means (link means) for generating execution verify logic and linking it with the digital contents; and 5 designates execution verify logic conversion software generating means for generating execution verify logic conversion software including execution verify logic conversion means for converting the execution verify logic of encapsulated contents into a newly generated execution verify logic.

Figure 2:
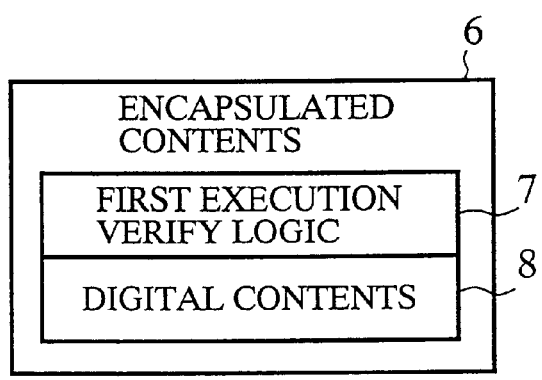
FIG. 2 is a block diagram showing a digitized contents generated by contents encapsulation means in the embodiment 1.

FIG. 2 is a block diagram showing digitized contents the contents encapsulation means 4 generates. In FIG. 2, the reference numeral 6 designates encapsulated contents; 7 designates a first execution verify logic that provides execution verify means for carrying out execution control and verification of the digital contents; and 8 designates digital contents which is digital information.

Here, the digital contents 8 include, for example, images, motion pictures, voice, text, software or their combinations. The first execution verify logic 7 consists of codes for controlling reference and execution operations in the course of displaying initial messages at a start, verifying the current digital contents 8, and making decisions of a user ID, machine ID or date and time, and is described using programming interface prepared for manipulating the digital contents 8. The decisions can be made by comparing values obtained during the execution with values embedded into the first execution verify logic 7, or by comparing the hash values of the two.

Next, the operation of the present embodiment 1 will be described.

Figure 3:
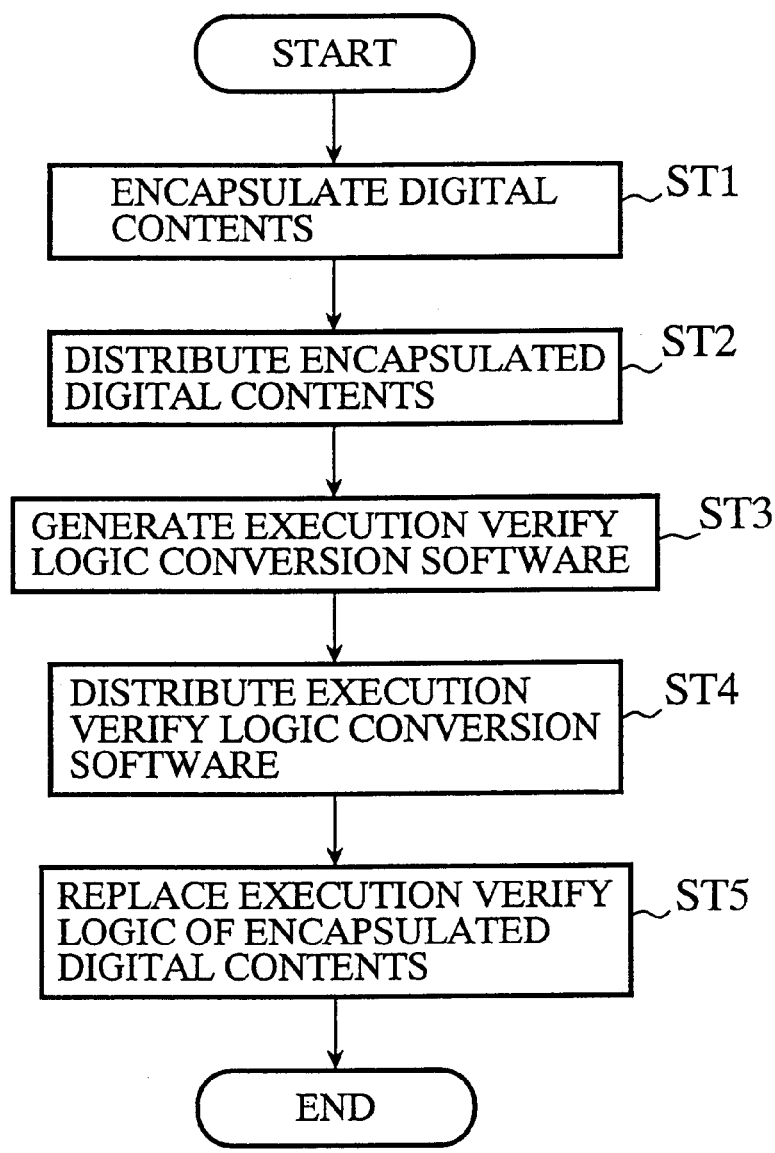
FIG. 3 is a flowchart illustrating an operation of the embodiment 1 of the digital contents distribution system.

FIG. 3 is a flowchart illustrating the operation of the present embodiment 1 of the digital contents distribution system.

In step ST1, the contents encapsulation means 4 in the digital contents distribution center 1 generates the first execution verify logic 7, and combines it with the digital contents 8 which have been generated using a tool like an authoring tool, thereby producing the encapsulated contents 6.

In the next step ST2, the digital contents distribution center 1 distributes to the user terminal 2 through the information transmission medium 3 the encapsulated contents 6 generated in step ST1.

In the subsequent step ST3, the execution verify logic conversion software generating means 5 in the digital contents distribution center 1 first generates second execution verify logic, and then generates execution verify logic conversion software including execution verify logic conversion means for replacing the first execution verify logic 7 in the encapsulated contents 6 with the second execution verify logic.

The first execution verify logic 7 and the second execution verify logic will be described in more detail later in connection with FIG. 8 in an embodiment 3.

In step ST4, the digital contents distribution center 1 distributes to the user terminal 2 through the information transmission medium 3 the execution verify logic conversion software generated in step ST3.

In the next step ST5, the user terminal 2 applies the execution verify logic conversion software distributed at step ST4 to the encapsulated contents 6 distributed in step ST2, thereby replacing the first execution verify logic 7 in the encapsulated contents 6 with the second execution verify logic.

The order of steps ST2 and ST3 can be exchanged, and steps ST2 and ST4 can be executed concurrently. Besides, the encapsulated contents 6 including the first execution verify logic 7 can be distributed to the user in advance as a trial-use version.

According to the present embodiment 1, the first execution verify logic 7, which is initially linked with the digital contents 8 to generate the encapsulated contents 6, is replaced afterward with the second execution verify logic. This enables the encapsulated contents 6 including the first execution verify logic 7 to be distributed as a trial-use digital contents whose operation is restricted, and then enables the execution verify logic conversion software to be distributed that replaces the first execution verify logic 7 with the second execution verify logic with a looser restriction, if the user sends to the digital contents distribution center 1 a request for purchasing them, and pays the charge for the request. Receiving the execution verify logic conversion software, the user applies it to the trial-use encapsulated contents 6, and this enables the actual-use encapsulated contents 6 to be installed. This offers an advantage of making it possible for the distributor to obtain charge information when the user carries out a processing for enabling the digital contents, and to permit the user to exploit the digital contents in accordance with the charge.

With a configuration different from the conventional system which distributes the key for permission, the present embodiment 1 replaces the execution verify logic. This offers an advantage of being able not only to switch between the execution and cancellation of restricting conditions embedded in advance into the digital contents, but also to flexibly change control conditions subsequently of the digital contents.

Furthermore, since the digital contents have a large capacity in general, their trial-use version can be distributed in the form of a CD-ROM or digital broadcasting, and the execution verify logic conversion software with a smaller capacity can be distributed through the Internet.

Embodiment 2

In the foregoing embodiment 1, the digital contents distribution center 1 encapsulates the digital contents and generates the execution verify logic conversion software. The digital contents distribution system of the present embodiment 2 reinforces the copyright protection of an original author as compared with the embodiment 1.

Figure 4:
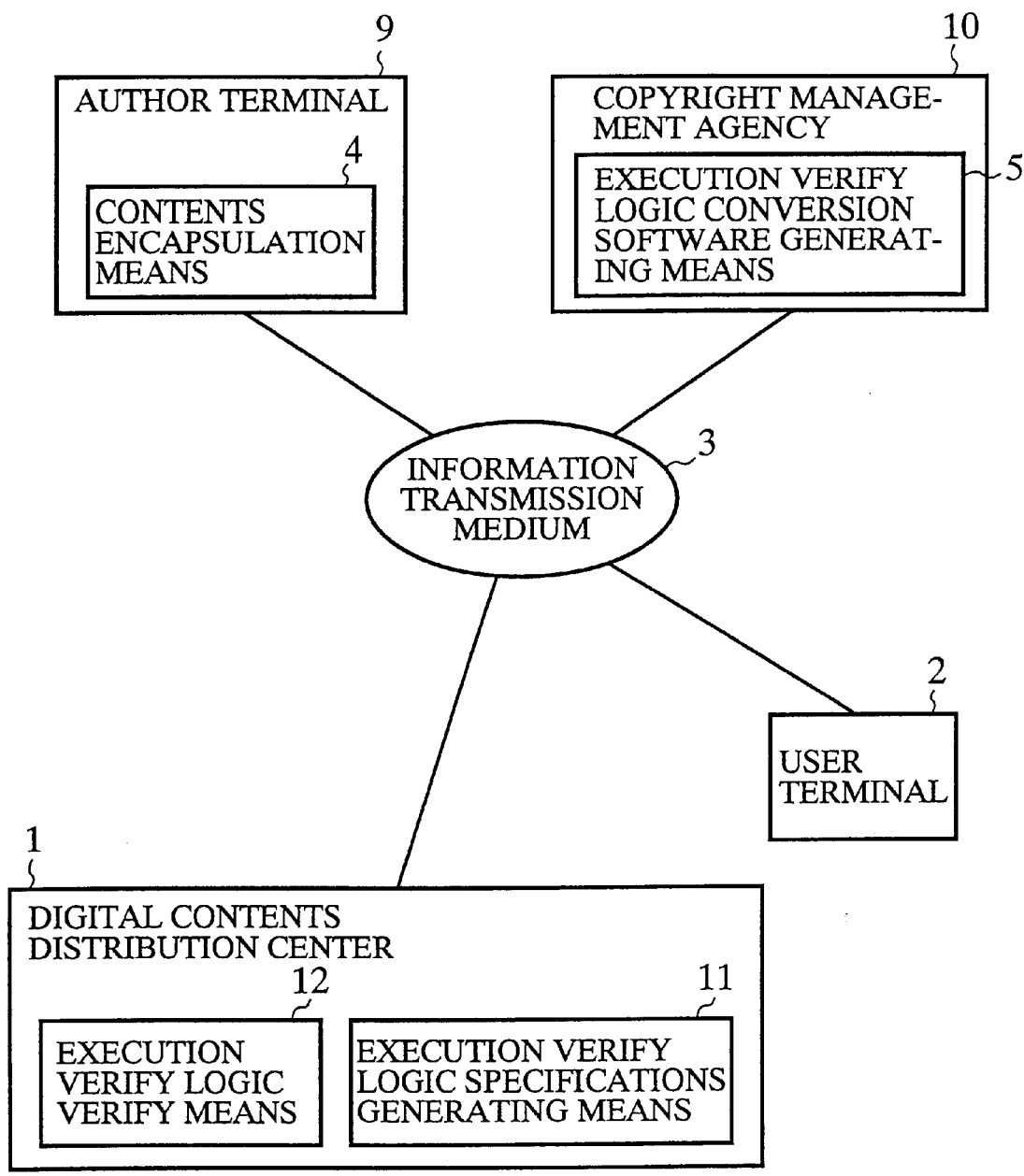
FIG. 4 is a block diagram showing the entire configuration of an embodiment 2 of the digital contents distribution system in accordance with the present invention.

FIG. 4 is a block diagram showing the entire configuration of the present embodiment 2 of the digital contents distribution system in accordance with the present invention, in which like or corresponding portions to those of FIG. 1 are designated by the same reference numerals and the description thereof is omitted here. In FIG. 4, the reference numeral 9 designates an author terminal used by an author of the digital contents; 10 designates a copyright management agency that carries out the copyright management on behalf of the author; 11 designates execution verify logic specifications generating means (specifications generating means) for generating specifications of the second execution verify logic, which are to be provided to the execution verify logic conversion software generating means 5; and 12 designates execution verify logic verify means (compare and verify means) for verifying the execution verify logic of the execution verify logic conversion software.

Next, the operation of the present embodiment 2 will be described.

Figure 5:
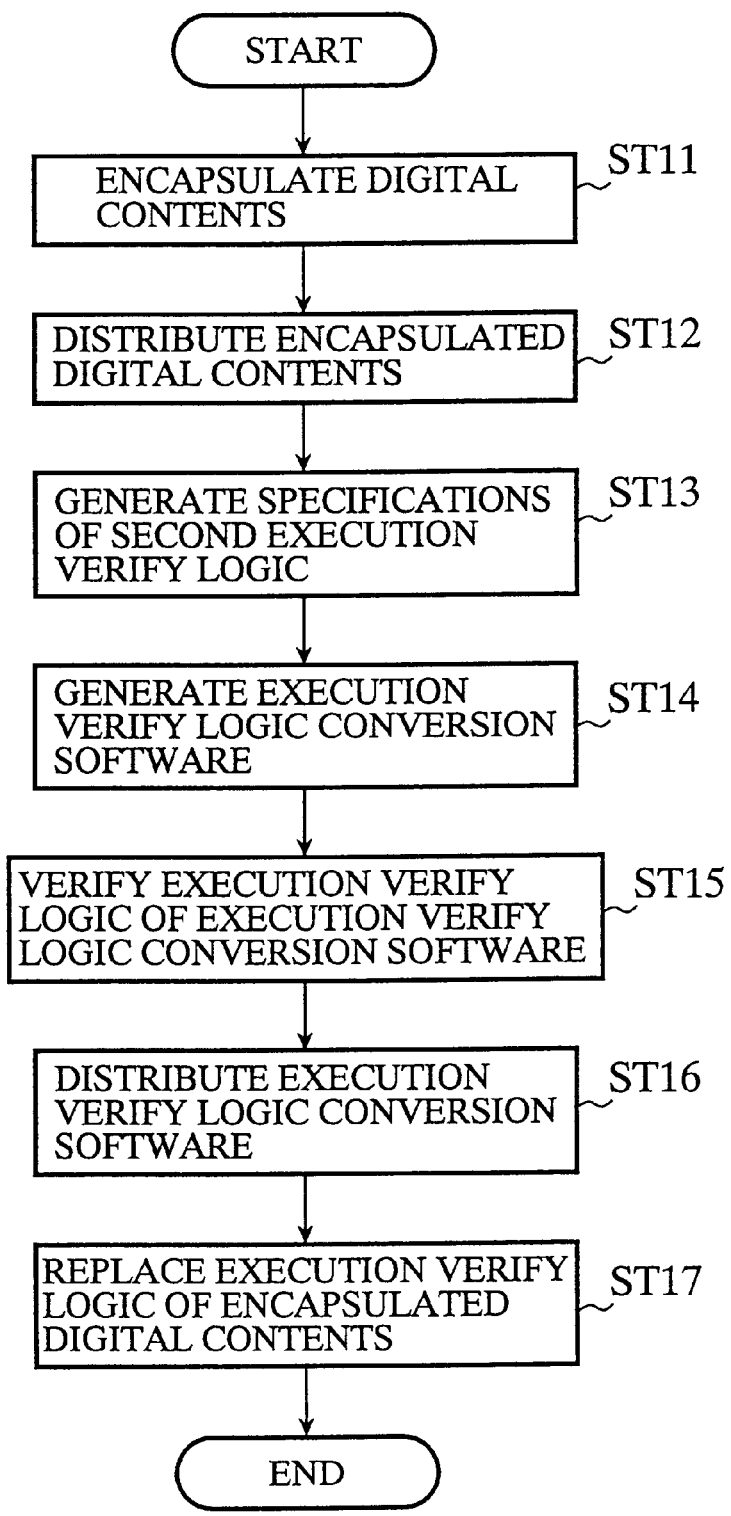
FIG. 5 is a flowchart illustrating an operation of the embodiment 2 of the digital contents distribution system.

FIG. 5 is a flowchart illustrating the operation of the present embodiment 2 of the digital contents distribution system.

In step ST11, the contents encapsulation means 4 in the author terminal 9 generates the first execution verify logic 7, and combines it with the digital contents 8 to produce the encapsulated contents 6.

In the next step ST12, the encapsulated contents 6 generated in step ST11 are distributed to the user terminal 2 through the information transmission medium 3. The distribution can be carried out by the author terminal 9, or via the copyright management agency 10 or via the digital contents distribution center 1. Alternatively, it can be carried out through a public communication network, or by way of a medium such as CD-ROMs or broadcasting.

In the subsequent step ST13, the execution verify logic specifications generating means 11 in the digital contents distribution center 1 generates the specifications of the second execution verify logic that the execution verify logic conversion software generating means 5 will substitute for the first execution verify logic 7. The specifications of the second execution verify logic can be execution verify logic itself, or take other forms such as description using a formal language.

In the next step ST14, the specifications of the second execution verify logic is transmitted via the information transmission medium 3 to the copyright management agency 10, in which the execution verify logic conversion software generating means 5 generates the execution verify logic conversion software including the second execution verify logic in accordance with the specifications.

In the subsequent step ST15, the execution verify logic conversion software generated in step ST14 is transmitted via the information transmission medium 3 to the digital contents distribution center 1, in which the execution verify logic verify means 12 verifies the second execution verify logic obtained from the execution verify logic conversion software. The verification makes a decision whether or not the execution verify logic conversion software can replace the first execution verify logic 7 with the second execution verify logic generated in step ST13 in accordance with the specifications.

In step ST16, the digital contents distribution center 1 distributes to the user terminal 2 through the information transmission medium 3 the execution verify logic conversion software verified in step ST15, if a positive verification result is obtained at step ST15.

In the next step ST17, the user terminal 2 applies the execution verify logic conversion software distributed at step ST16 to the encapsulated contents 6 distributed at step ST12, and replaces the first execution verify logic 7 in the encapsulated contents 6 with the second execution verify logic 17, thereby installing it. The encapsulated contents 6 has the same structure as the encapsulated contents 6 of the embodiment 1 as shown in FIG. 2.

If the verification in step ST15 provides a negative result, that is, if unintended execution verify logic conversion software is transmitted to the digital contents distribution center 1, a warning message is presented, for example. Thus, the digital contents distribution center 1 can abandon the distribution to the user, and take steps such as making protest to the copyright management agency 10.

According to the present embodiment 2, the copyright management agency 10 generates the execution verify logic conversion software. This offers an advantage of enabling the author to follow the distribution state by the distributor.

Furthermore, since the distributor carries out the generation of the specifications of the substitute execution verify logic, and verifies the execution verify logic conversion software, the present embodiment 2 has an advantage that the distributor can grant a user a license in accordance with the charge as in the foregoing embodiment 1. In other words, the author can carry out the copyright management, and the distributor the charge management.

Embodiment 3

Although the description of the foregoing embodiments 1 and 2 of the digital contents distribution system is provided from the viewpoint of the entire flow of the digital contents distribution, an embodiment will now be described that can provide improved security against infringement or tampering.

Figure 6:
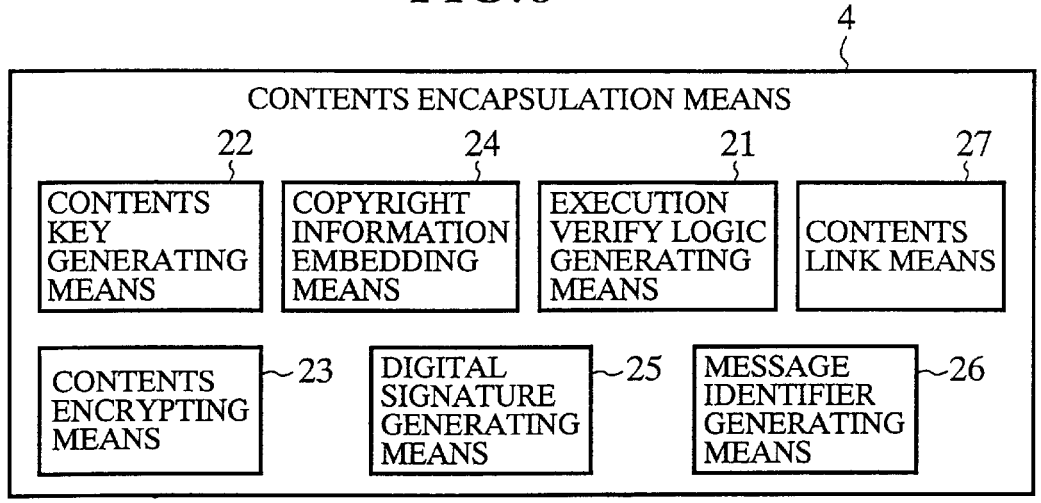
FIG. 6 is a block diagram showing a configuration of contents encapsulation means of an embodiment 3 of the digital contents distribution system in accordance with the present invention.

FIG. 6 is a block diagram showing the detail of the contents encapsulation means 4 in an embodiment 3 of the digital contents distribution system in accordance with the present invention. In FIG. 6, the reference numeral 4 designates contents encapsulation means similar to that described in connection with FIG. 1; 21 designates execution verify logic generating means for generating the first execution verify logic; 22 designates contents key generating means for generating a symmetric key (contents key) for encrypting the digital contents; 23 designates contents encrypting means for encrypting the digital contents using the contents key generated by the contents key generating means 22; 24 designates copyright information embedding means (digital watermarking means) for embedding, using digital watermarking, into the digital contents the copyright information designated by the author; 25 designates digital signature generating means for generating a digital signature for the digital contents into which the copyright information is embedded; 26 designates message identifier generating means for generating a message identifier of the first execution verify logic generated by the execution verify logic generating means 21; and 27 designates contents link means for linking the first execution verify logic and the message identifier with the digital contents which undergoes the electronic watermark and encryption.

Figure 7:
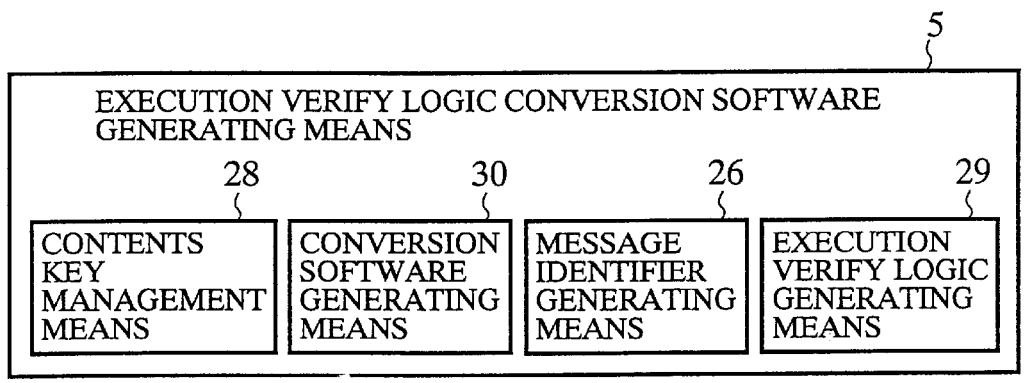
FIG. 7 is a block diagram showing a configuration of execution verify logic conversion software generating means of the embodiment 3 of the digital contents distribution system.

FIG. 7 is a block diagram showing the detail of the execution verify logic conversion software generating means 5. In FIG. 7, the execution verify logic conversion software generating means 5 is the same as that of FIG. 1, and the message identifier generating means 26 is the same as that of FIG. 6. The reference numeral 28 designates contents key management means (encrypted contents management means) for managing the contents key, which is generated by the contents key generating means 22, in conjunction with the ID of the encrypted digital contents; 29 designates execution verify logic generating means for generating the second execution verify logic based on its specifications generated by the execution verify logic specifications generating means 11 as shown in FIG. 4; and 30 designates conversion software generating means for generating the execution verify logic conversion software using the second execution verify logic generated by the execution verify logic generating means 29, the message identifier of the second execution verify logic generated by the message identifier generating means 26 and the symmetric key of the contents which is managed by the contents key management means 28.

Figure 8:
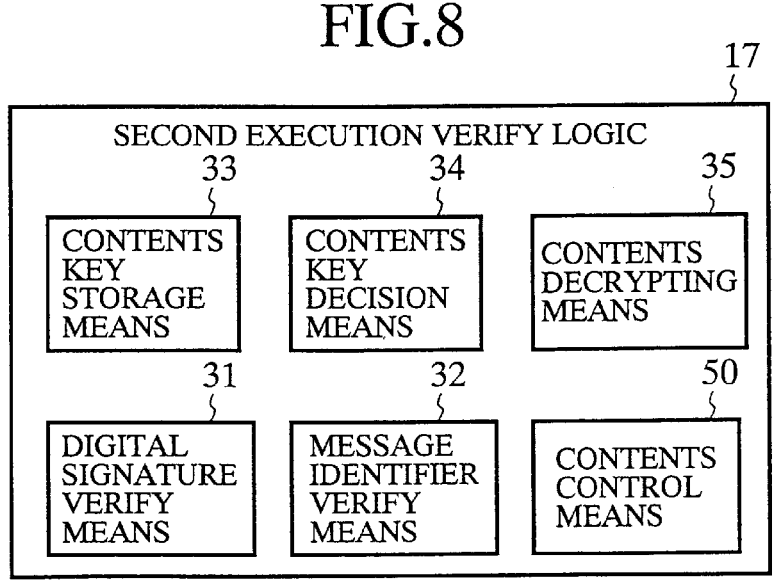
FIG. 8 is a block diagram showing a structure of a second execution verify logic of the embodiment 3 of the digital contents distribution system.

FIG. 8 is a block diagram showing the detail of the second execution verify logic. In FIG. 8, the reference numeral 17 designates a second execution verify logic similar to the first execution verify logic 7 as shown in FIG. 2; 31 designates digital signature verify means for verifying the validity of the digital signature added to the encapsulated contents; 32 designates message identifier verify means (identifier verify means) for verifying the validity of the message identifier added to the encapsulated contents; 33 designates contents key storage means for storing the symmetric key used for encrypting the digital contents; 34 designates contents key decision means (contents key storage decision means) for making a decision as to whether the contents key is stored in the contents key storage means 33; and 35 designates contents decrypting means (decrypting means) for decrypting, using the contents key, the encrypted digital contents.

Next, the operation of the present embodiment 3 will be described.

The present embodiment 3 differs from the embodiments 1 and 2 in operations of encapsulating the digital contents and of generating the execution verify logic conversion software, and hence only the different operations will be described. In the following description, it is assumed that the contents encapsulation means 4 and execution verify logic conversion software generating means 5 are provided in the same locations as those of the embodiment 2.

Figure 9:
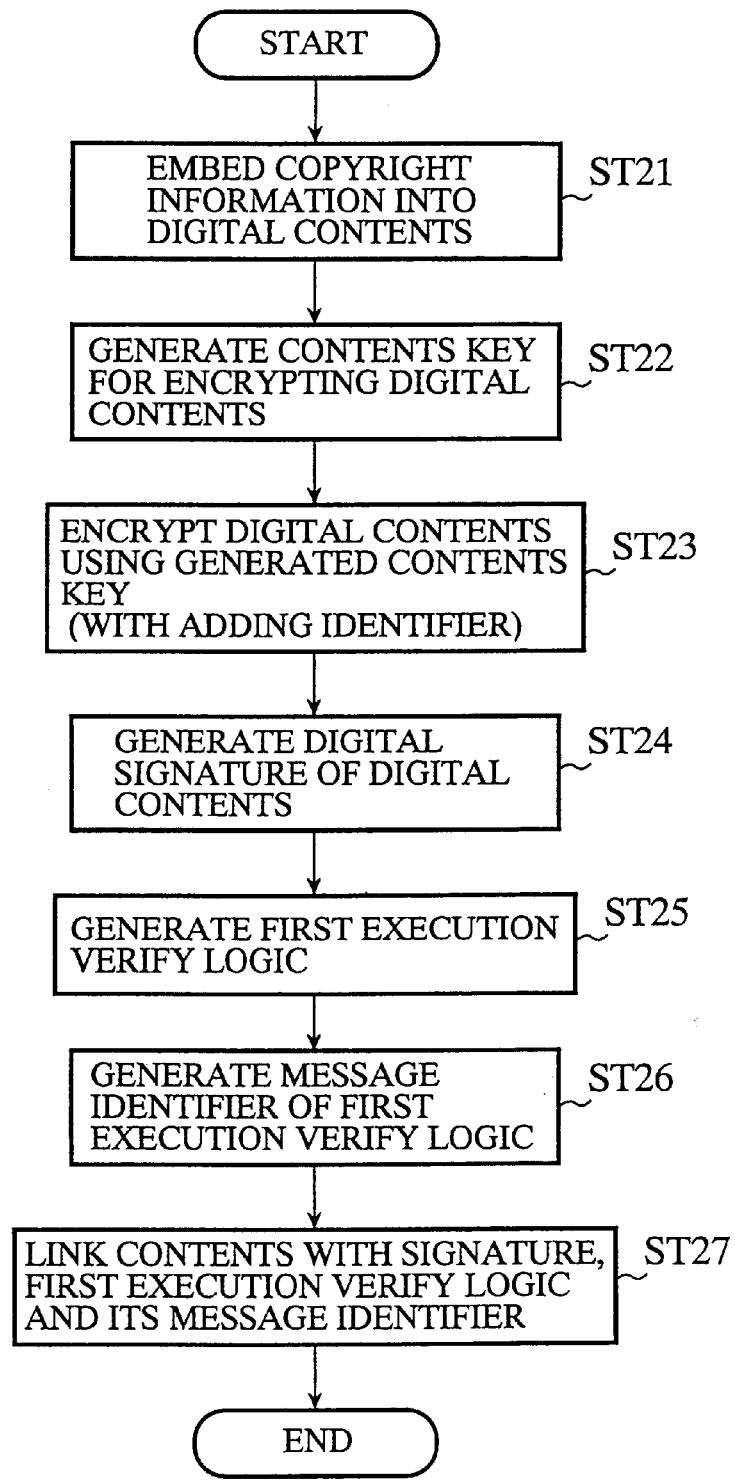
FIG. 9 is a flowchart illustrating the operation of contents encapsulation in the embodiment 3.

FIG. 9 is a flowchart illustrating the operation of the encapsulation of the contents.

In step ST21, the copyright information embedding means 24 in the author terminal 9 embeds into the digital contents of interest the copyright information designated by the author, using appropriate electronic watermark technique.

In the next step ST22, the contents key generating means 22 generates the contents key for encrypting a part of or all of the digital contents to be encapsulated. In this case, portions to be restricted in use and reference are subjected to the encryption.

In the subsequent step ST23, the contents encrypting means 23 encrypts the digital contents using the contents key generated by the contents key generating means 22 in step ST22. The encrypted digital contents are each attached with an identifier that can be always referred to.

In the following step ST24, the digital signature generating means 25 generates the digital signature of the encrypted digital contents. In this case, the private key used for encrypting the digital signature belongs to the author.

In the next step ST25, the execution verify logic generating means 21 generates the first execution verify logic 7 with the same structure as that shown in FIG. 8. The contents key, however, is not stored in the contents key storage means 33 of the initially generated first execution verify logic 7. Thus, the encrypted digital contents cannot be decoded, and cannot be referred to nor executed in the start processing of the encapsulated contents. In the case where the suitable contents key is stored in the contents key storage means 33, the contents key decision means 34 detects the contents key, and the contents decrypting means 35 decrypts the encrypted digital contents in the start processing, followed by the remaining processing.

Storing the decrypted digital contents in the main storage of the user terminal 2 during the processings, and erasing them therefrom at the end of the processings can prevent them from being easily retrieved, improving the security against the infringement or unlicensed copy.

In the subsequent step ST26, the message identifier generating means 26 calculates the hash value of the first execution verify logic 7, and generates it as the message identifier of the first execution verify logic 7. The first execution verify logic 7 the execution verify logic generating means 21 generates is structured such that it includes the message identifier verify means 32 for verifying its own message identifier.

In step ST27, the contents link means 27 links the encrypted digital contents with the digital signature, the first execution verify logic 7 and its message identifier.

Next, the operation of generating the execution verify logic conversion software will be described.

Figure 10:
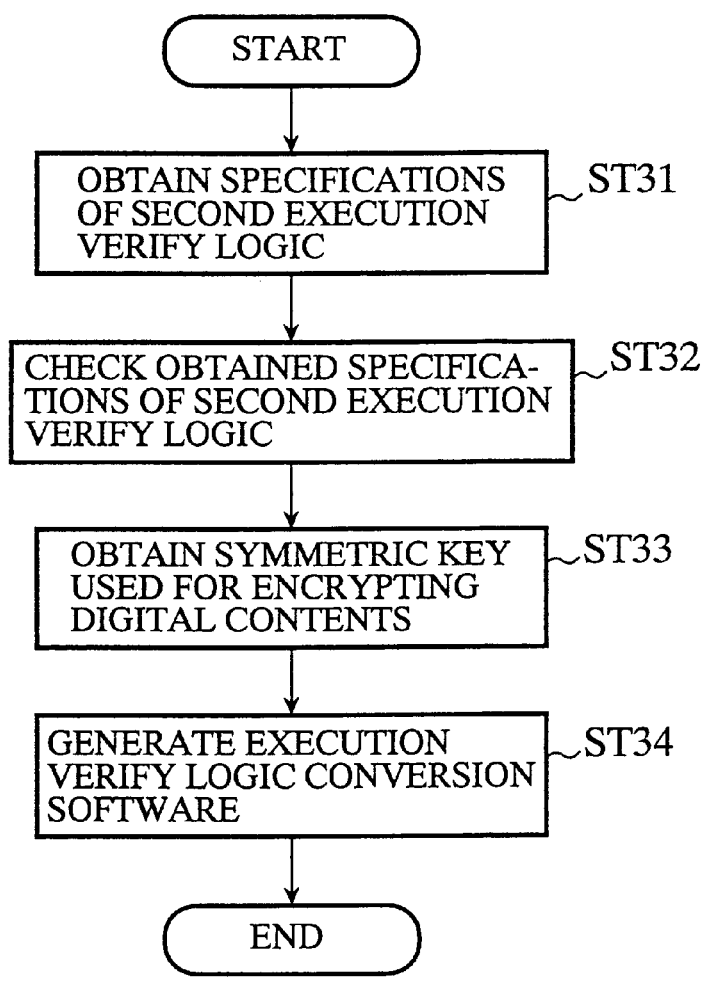
FIG. 10 is a flowchart illustrating the operation of generating execution verify logic conversion software in the embodiment 3.

FIG. 10 is a flowchart illustrating the generating operation of the execution verify logic conversion software.

First, in step ST31, the execution verify logic conversion software generating means 5 obtains through the information transmission medium 3 the specifications of the second execution verify logic generated by the execution verify logic specifications generating means 11 in the digital contents distribution center 1.

In the next step ST32, the execution verify logic generating means 29 of the execution verify logic conversion software generating means 5 checks whether or not the copyright management agency 10 can accept the specifications of the second execution verify logic obtained in step ST31, and proceeds to step ST33 and onward if it can accept it.

If it is found from the contents of the specifications of the second execution verify logic obtained in step ST31 that the decryption of the encrypted digital contents is necessary for carrying on the processing, the contents key management means 28 is provided with the message identifier of the encrypted digital contents to obtain the symmetric key for encrypting the digital contents.

Finally, in step ST34, the execution verify logic conversion software generating means 5 generates from the specifications of the second execution verify logic obtained in step ST31 the second execution verify logic 17 including the digital signature verify means 31 for verifying the copyright information of the digital contents, the message identifier verify means 32 for verifying the tampering of the first execution verify logic 7 itself, the contents key storage means 33 for storing the contents key which is the symmetric key obtained at step ST33, the contents key decision means 34 for making a decision of the presence of the contents key, the contents decrypting means 35 for decrypting the encrypted digital contents, the contents control means 50 for controlling the restriction on the contents in terms of their use or reference, and the message identifier of the first execution verify logic 7 itself generated by the message identifier generating means 26, thereby producing the execution verify logic conversion software to be substituted for the first execution verify logic 7 of the encapsulated contents 6.

According to the embodiment 3, the copyright information embedding means 24 is provided for inseparably embedding into the digital contents the copyright information designated by the author. This offers an advantage of being able to easily prevent the unlicensed use of the digital contents.

In addition, the contents key generating means 22 and contents encrypting means 23 provided for encrypting the digital contents can offer an advantage of being able to easily prevent the unlicensed use or copy of the digital contents.

Furthermore, the digital signature, the digital signature generating means 25 and the digital signature verify means 31 for verifying the digital signature can offer an advantage of being able to easily prevent the tampering of the digital contents, and to confirm the author without difficulty.

Moreover, generating the message identifiers of the execution verify logics, and providing the message identifier generating means 26 and message identifier verify means 32 for verifying the message identifier can offer an advantage of being able to prevent the tampering of the execution verify logics themselves.

Embodiment 4

The foregoing embodiment 3 generates the second execution verify logic 17 that includes the contents key storage means 33 for storing the contents key, and the like, generates the execution verify logic conversion software that substitutes the second execution verify logic 17 for the first execution verify logic 7 in the encapsulated contents 6, and stores in the execution verify logic conversion software the contents key as it is for encrypting the digital contents. The present embodiment 4 of the digital contents distribution system exchanges more safely the contents key for encrypting the digital contents.

Figure 11:
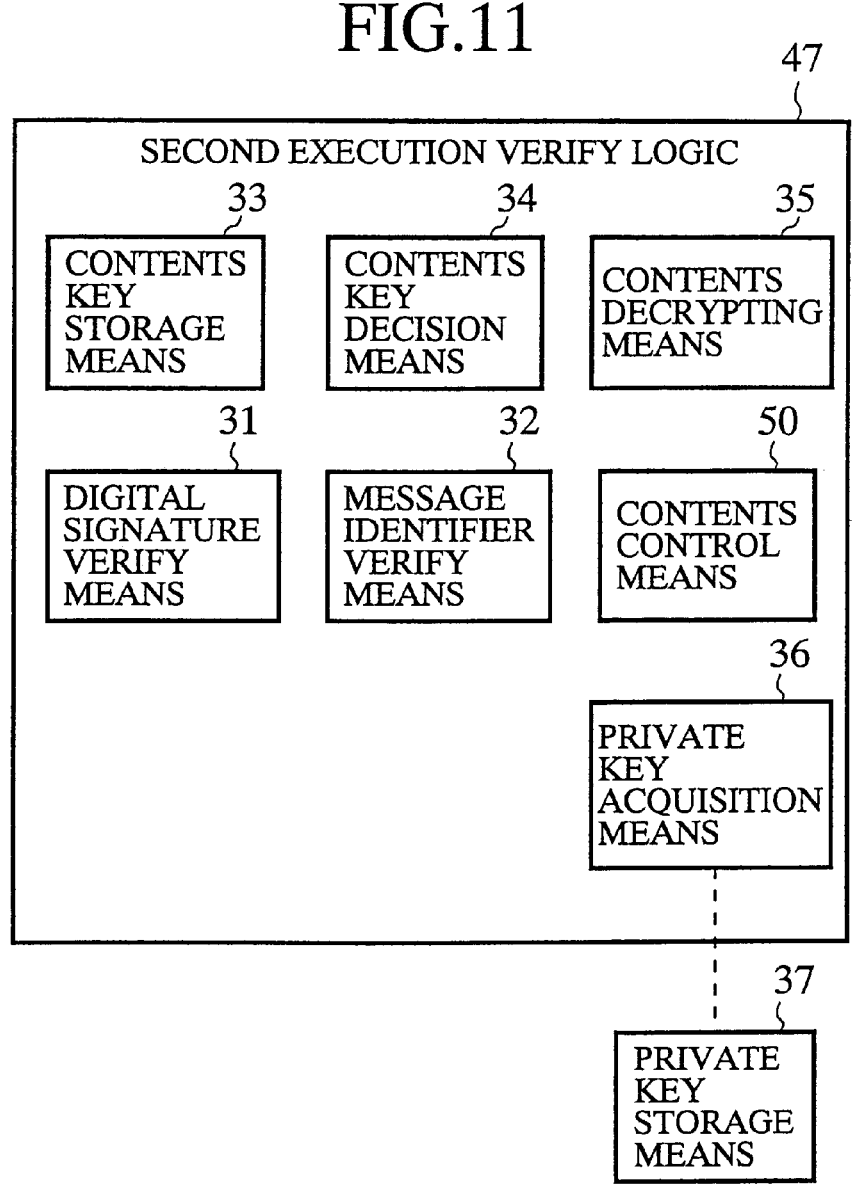
FIG. 11 is a block diagram showing a structure of a second execution verify logic of an embodiment 4 of the digital contents distribution system in accordance with the present invention.

FIG. 11 is a block diagram showing a configuration of a second execution verify logic 47 in the present embodiment 4 of the digital contents distribution system in accordance with the present invention. In FIG. 11, the same or corresponding portions to those of FIG. 8 are designated by the same reference numerals, and the description thereof is omitted here. In FIG. 11, the reference numeral 36 designates private key acquisition means for acquiring the private key of a user; and 37 designates private key storage means for storing the private key of the user of the user terminal 2.

Next, the operation of the present embodiment 4 will be described.

The present embodiment 4 differs from the foregoing embodiment 3 in the operation for generating the execution verify logic conversion software.

Figure 12:
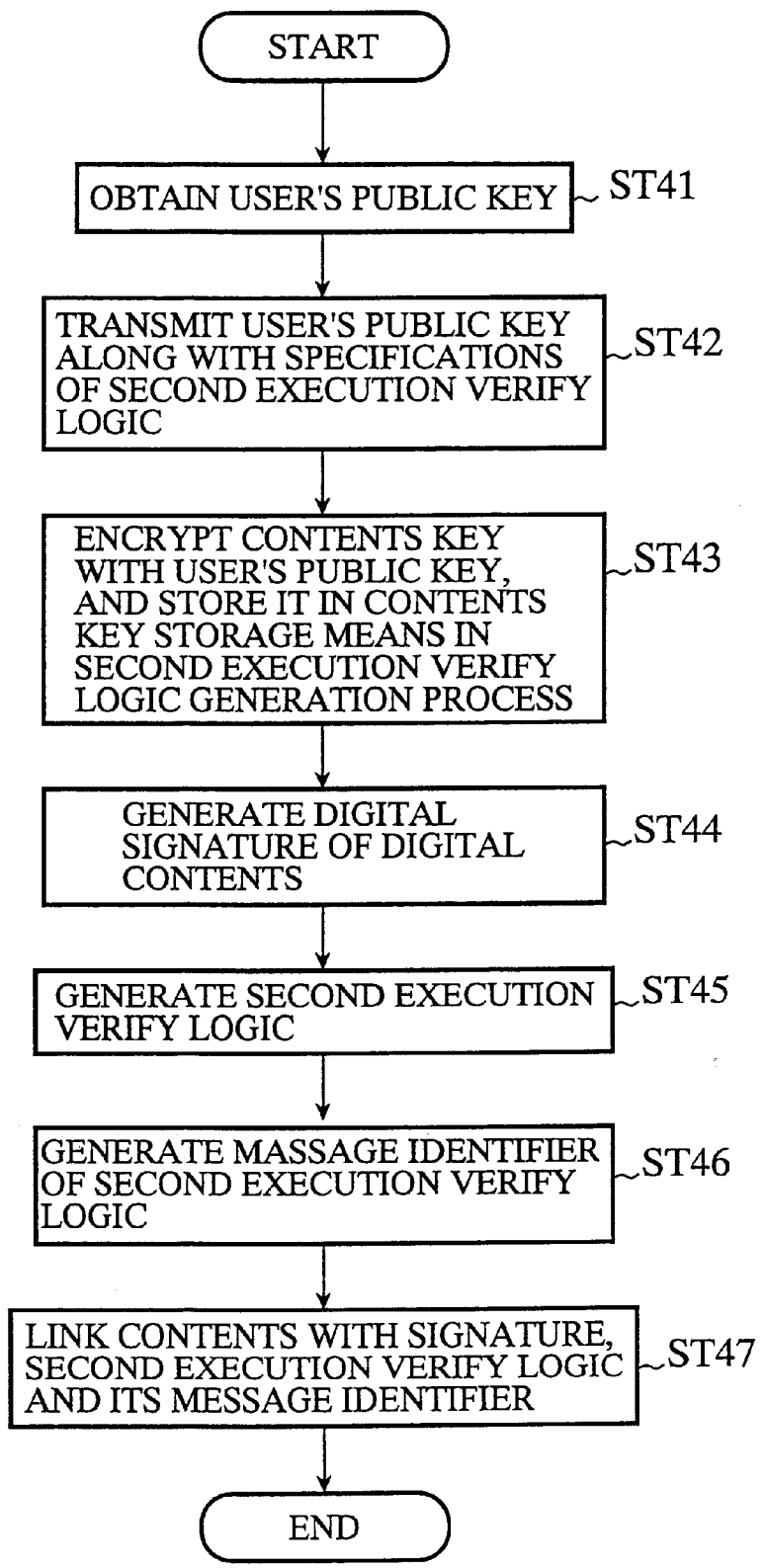
FIG. 12 is a flowchart illustrating the generating operation of the execution verify logic conversion software in the embodiment 4.

FIG. 12 is a flowchart illustrating the operation of generating the execution verify logic conversion software in the digital contents distribution system.

First, the execution verify logic conversion software generating means 5 obtains through the information transmission medium 3 the specifications of the second execution verify logic 47 generated by the execution verify logic specifications generating means 11 in the digital contents distribution center 1, which corresponds to step ST31 in the procedure of generating the execution verify logic conversion software in FIG. 10. In the present embodiment 4, however, the digital contents distribution center 1 acquires in step ST41 of FIG. 12 the public key in a user's public key system, when it receives from the user a request to purchase the contents.

In the subsequent step ST42, the digital contents distribution center 1 transmits to the copyright management agency 10 the public key in conjunction with the specifications of the second execution verify logic 47.

In the next step ST43, the execution verify logic conversion software generating means 5 in the copyright management agency 10 checks, as in the step ST32 of FIG. 10, the specifications of the second execution verify logic 47 sent in the preceding step ST42, provides the contents key management means 28 with the message identifier of the digital contents subjected to the encryption, and acquires the contents key used for encrypting the digital contents as in the step ST33 of FIG. 10. Then, before the contents key is stored in the contents key storage means 33, it is encrypted using the user's public key sent in the preceding step ST42.

When the contents are decrypted, the execution verify logic conversion software is generated which replaces the first execution verify logic 7 with the second execution verify logic 47 including the private key acquisition means 36 that acquires the user's private key.

Steps ST44–ST47 are the steps of generating the execution verify logic conversion software, which includes the steps of generating a set of the digital signature of the digital contents, second execution verify logic 47, and its message identifier, and the link processing of them with the contents.

When the user exploits the actual-use encapsulated contents obtained by applying the execution verify logic conversion software on the trial-use encapsulated contents, the decryption of the encrypted digital contents is carried out as follows: First, the private key acquisition means 36 acquires the user's private key from the private key storage means 37 in the user terminal 2; second, the contents key stored in the contents key storage means 33 is decrypted using the private key; and then, the digital contents in the encapsulated contents are decrypted using the contents key.

In short, the present embodiment 4 is configured such that the execution verify logic conversion software generating means 5 in the copyright management agency 10 places in the execution verify logic conversion software the contents key after encrypting it with the user's public key, and the contents are decrypted, when the user exploits them, with the contents key after decrypting the encrypted contents key with the user's private key. This offers an advantage of being able to implement a secure digital contents distribution system from which the distributor cannot easily retrieve the contents key.

Embodiment 5

The embodiment 5 of the digital contents distribution system in accordance with the present invention will now be described. In this digital contents distribution system, the user can embed his or her own information when replacing the first execution verify logic with the second execution verify logic in the encapsulated contents.

Figure 13:
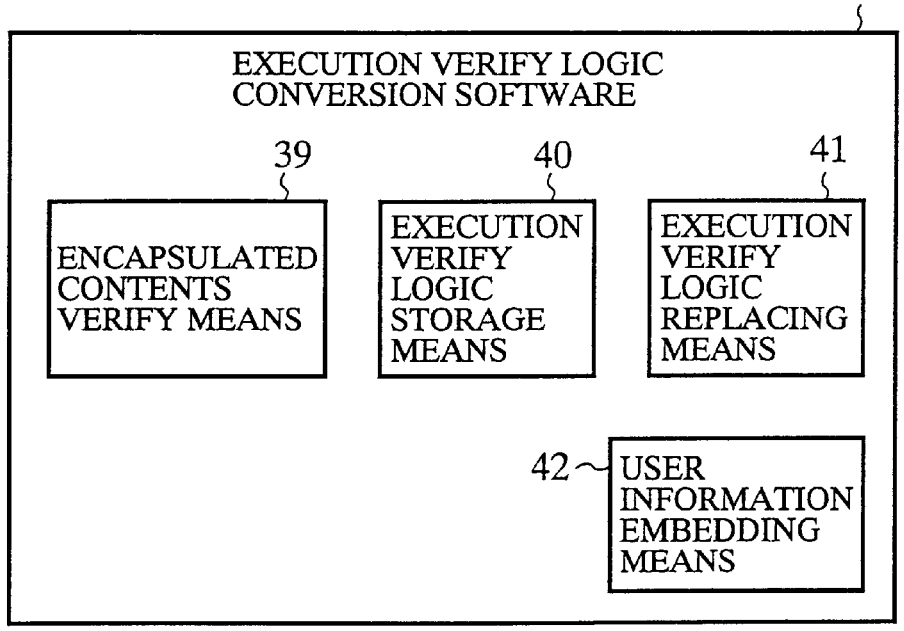
FIG. 13 is a block diagram showing a structure of execution verify logic conversion software of an embodiment 5 of the digital contents distribution system in accordance with the present invention.

FIG. 13 is a block diagram showing a configuration of an execution verify logic conversion software in the embodiment 5 of the digital contents distribution system in accordance with the present invention. In FIG. 38, the reference numeral 38 designates the execution verify logic conversion software; 39 designates encapsulated contents verify means for verifying the digital contents and first execution verify logic, which are incorporated into the encapsulated contents 6; 40 designates execution verify logic storage means for storing the second execution verify logic which is a new substitute; 41 designates execution verify logic replacing means for replacing the execution verify logic; and 42 designates user information embedding means for embedding the user information.

Next, the operation of the present embodiment 5 will be described.

Figure 14:
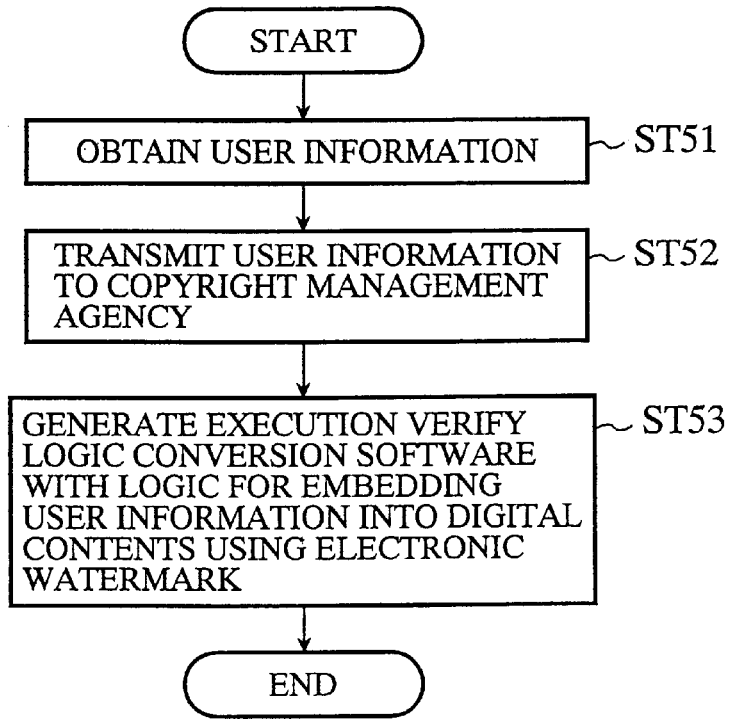
FIG. 14 is a flowchart illustrating the generating operation of the execution verify logic conversion software in the embodiment 5.

FIG. 14 is a flowchart illustrating the operation of generating the execution verify logic conversion software in the digital contents distribution system.

In step ST51, the digital contents distribution center 1 acquires, when the user requires to purchase the contents, the user information such as the identifier, name and affiliation of the user.

In the next step ST52, the digital contents distribution center 1 transmits to the copyright management agency 10 via the information transmission medium 3 the user information obtained in step ST51 together with the specifications of the second execution verify logic.

The subsequent step ST53 generates the execution verify logic conversion software 38 including logic for embedding the user information into the digital contents, using the electronic watermark. More specifically, the execution verify logic conversion software generating means 5 in the copyright management agency 10 generates the execution verify logic conversion software 38 that includes the user information embedding means 42 for embedding the user information into the contents when the execution verify logic conversion software is activated.

Since the present embodiment 5 exploits the user information accompanying his or her purchase request, it can embed precise user information into the execution verify logic conversion software 38.

Furthermore, the execution verify logic conversion software 38 includes the user information embedding means 42 for embedding the user information in the present embodiment. This offers an advantage of being able to embed the user information into the contents without any additional complicated procedure, when installing the actual-use contents instead of the trial-use contents.

Embodiment 6

The embodiment 6 of the digital contents distribution system in accordance with the present invention will now be described. This embodiment relates to the digital contents distribution system that can report charge information to the distributor when replacing the execution verify logic in the encapsulated contents.

Figure 15:
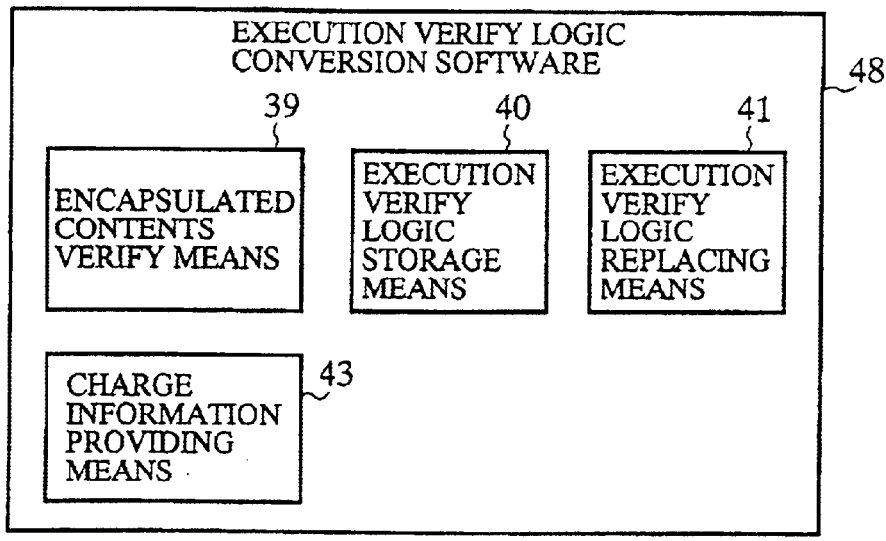
FIG. 15 is a block diagram showing a structure of execution verify logic conversion software of an embodiment 6 of the digital contents distribution system in accordance with the present invention.
Figure 16:
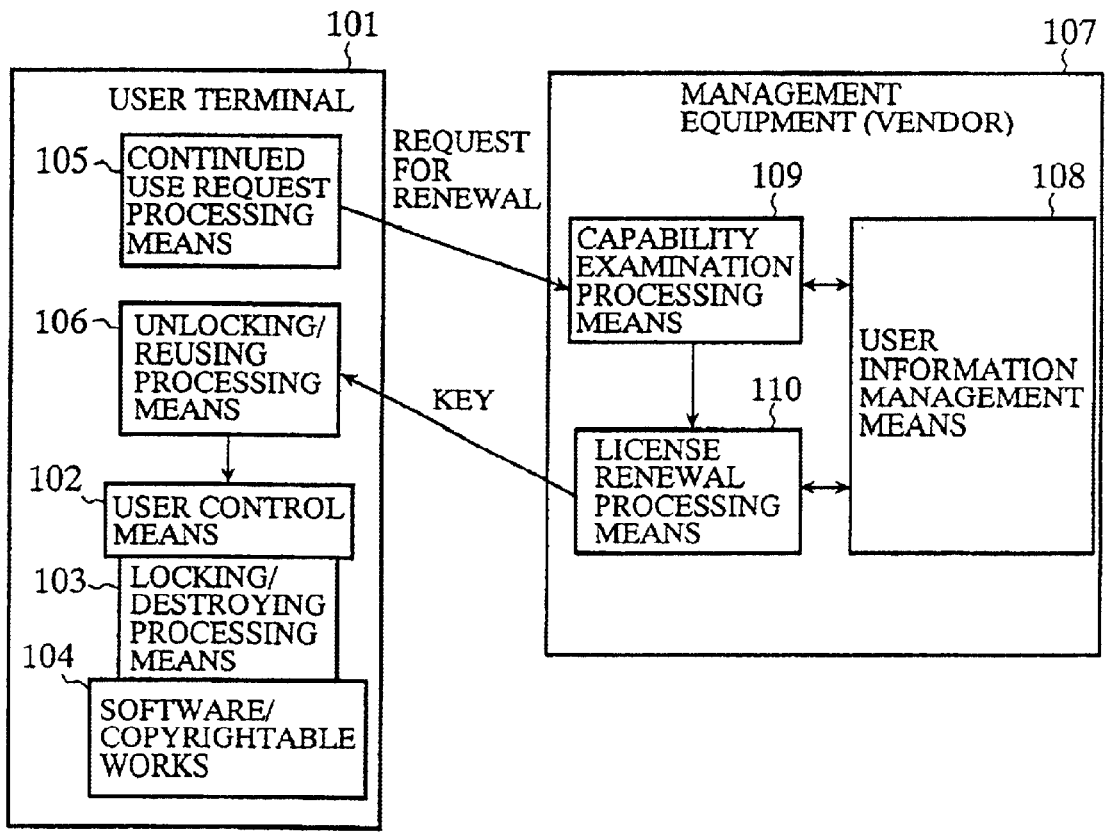
FIG. 16 is a block diagram showing a conventional digital contents distribution system.

FIG. 15 is a block diagram showing a structure of execution verify logic conversion software 48 in the present embodiment 6 of the digital contents distribution system in accordance with the present invention. In FIG. 15, the same or corresponding portions to those of FIG. 13 are designated by the same reference numerals, and the description thereof is omitted here. In FIG. 15, the reference numeral 43 designates charge information providing means for transmitting the charge information from the user terminal 2 to the digital contents distribution center 1 via the information transmission medium 3, when replacing the execution verify logic.

Next, the operation of the present embodiment 6 will be described.

The execution verify logic conversion software 48 is generated through the following process. First, the specifications of the second execution verify logic, which are generated by the execution verify logic specifications generating means 11 in the digital contents distribution center 1, are created such that they include a function to transmits, when the user activates the execution verify logic conversion software 48, information such as the identifier of the contents, and the user's identifier, name, affiliation and the like, to the digital contents distribution center 1 through the information transmission medium 3. Second, the logic to implement such a function and the destination address are placed into the specifications of the second execution verify logic. Third, the specifications are transmitted to the copyright management agency 10 through the information transmission medium 3. Finally, the execution verify logic conversion software generating means 5 in the copyright management agency 10 generates the execution verify logic conversion software 48 including the charge information providing means 43 in accordance with the specifications.

Thus, the present embodiment 6 transmits, when the execution verify logic conversion software 48 is activated, the information such as the user's identifier, name and affiliation, which are stored in advance, together with the identifier of the contents to the digital contents distribution center 1. This offers an advantage of being able to charge when the contents is changed from the trial-use to actual-use version, that is, when the latter is installed.

In addition, the present embodiment 6 is configured such that a tamper free area the user cannot freely rewrite is provided not in the digital contents distribution center 1 but in the user terminal 2, that the tamper free area stores the user information such as his or her identifier, name and affiliation in conjunction with the identifier of the contents, and that the stored information can be obtained when the execution verify logic conversion software 48 is activated. This offers an advantage of being able to synchronize the installation of the actual-use version and the charge.

What is claimed is:

1. A digital contents distribution system comprising:
   an author terminal for transmitting digital contents;
   a copyright manager for carrying out copyright management of said transmitted digital contents;
   a distribution center for distributing said digital contents and receiving requests for a different degree of access to said digital contents;
   at least one user terminal that receives said digital contents; and
   an information transmission medium that interconnects said author terminal, said copyright manager, said distribution center and said user terminal,
   wherein said author terminal comprises link means for generating a first logic scheme for verification and execution control of said digital contents, said link means linking said first logic scheme with said digital contents,
   wherein said copyright manager comprises a logic conversion software generator generating logic conversion software including a second logic scheme in accordance with specifications of said second logic scheme transmitted from said distribution center for replacing said first logic scheme with said second logic scheme upon execution by said user terminal, the second logic scheme providing the user terminal with a different degree of access to the digital contents than the first logic scheme, thereby precluding said distribution center from changing the degree of access to the digital contents granted to the user terminal without first receiving said logic conversion software from said copyright manager, and
   wherein said distribution center comprises generating means for generating said specifications of said second logic scheme when said distribution center receives a request for a different degree of access to said digital contents, and an evaluator for comparing said second logic scheme, included in said conversion software transmitted from said copyright manager, with said specifications of said second logic scheme, generated in said distribution center, to verify said second logic scheme, and wherein said distribution center provides said user terminal with at least part of said conversion software and said digital contents linked with said first logic scheme and said conversion software, via said information transmission medium.

2. The digital contents distribution system as claimed in claim 1, wherein said second logic scheme has less severe execution restrictions than said first logic scheme.

3. The digital contents distribution system as claimed in claim 1 wherein said digital contents distribution center provides said user terminal with said conversion software and said digital contents linked with said first logic scheme, via a communications channel.

4. The digital contents distribution system as claimed in claim 11, wherein said link means comprises:
   contents key generating means for generating a contents key for encrypting at least part of said digital contents;
   contents encrypting means for encrypting at least part of said digital contents using said generated contents key;
   digital watermarking means for inseparably incorporating predetermined information into said digital contents in the form of digital watermarking;
   digital signature generating means for generating a digital signature of said digital contents;
   first identifier generating means for generating a hash value of said first logic scheme as a first message identifier; and
   contents link means for linking said digital signature, said first logic scheme and said first message identifier with said digital contents which have been encrypted at least in part by said contents encrypting means, and undergone digital watermarking by said digital watermarking means.

5. The digital contents distribution system as claimed in claim 4, wherein said logic conversion software generator comprises:
   an encryption manager for managing, in connection with said contents key, said first message identifier of said digital contents encrypted by said contents encrypting means;
   second identifier generating means for generating a hash value of said second logic scheme as a second message identifier; and
   second execution verify logic generating means for generating said second logic scheme in accordance with its specifications transmitted from said digital contents distribution center; and
   conversion software generating means for generating conversion software for replacing said first logic scheme with said second logic scheme generated by said second logic generating means.

6. The digital contents distribution system as claimed in claim 5, wherein said second logic scheme comprises:
   digital signature verify means for verifying digital signature of said digital contents;
   identifier verify means for verifying said second message identifier;
   contents key storage means for storing said contents key;
   contents key storage decision means for determining whether said contents key is stored in said contents key storage means; and
   decrypting means for decrypting said encrypted digital contents with said contents key, when said contents key is stored in said contents key storage means.

7. The digital contents distribution system as claimed in claim 6, wherein said contents key storage means stores said encrypted contents key encrypted using a public key of a user to whom said digital contents are to be distributed.

8. The digital contents distribution system as claimed in claim 7, wherein said second logic scheme comprises private key acquisition means for acquiring a private key of said user and wherein said decrypting means decrypts said encrypted contents key with said private key of said user, and decrypts said encrypted digital contents with said decrypted contents key.

9. The digital contents distribution system as claimed in claim 1, wherein said conversion software comprises user information embedding means for embedding user information into said digital contents using digital watermarking.

10. The digital contents distribution system as claimed in claim 1, wherein said logic conversion software comprises charge information providing means for transmitting charge information to said digital contents distribution center via said information transmission medium, when said first logic scheme is changed to said second logic scheme.

11. The digital contents distribution system of claim 1 wherein the conversion software facilitates embedding user information into the digital contents using digital watermarking consistent with the second logic scheme.

12. A digital contents distribution method comprising the steps of:
   generating a first logic scheme for verification and execution control of said digital contents;
   linking the generated first logic scheme with said digital contents;
   communicating the digital contents and the first logic scheme from a digital contents distribution center to a user terminal;
   receiving, at said distribution center, a request for a different degree of access to said digital contents;
   generating logic conversation software in accordance with specifications transmitted by said distribution center, said specifications reflecting said request for a different degree of access;
   transmitting said logic conversion software to said distribution center;
   providing the user terminal with at least part of said logic conversion software for converting the first logic scheme into a second logic scheme for verification and execution control of said digital contents, the second logic scheme permitting a different degree of access of the user terminal to the digital contents than the first logic scheme; and
   executing said at least part of said logic conversion software at said user terminal to convert the first logic scheme linked to said digital contents into said second logic scheme.

13. The method according to claim 12 wherein the second logic scheme provides greater access to the digital contents than the first logic scheme provides.

14. The method according to claim 12 wherein said second logic scheme has less severe execution restrictions than said first logic scheme.

15. The method according to claim 12 wherein the providing step comprises providing the user terminal with all of said conversion software and said digital contents linked with said first logic scheme.

16. The method according to claim 12 wherein linking step further comprises the steps of:
   generating a contents key for encrypting at least part of said digital contents;

encrypting at least part of said digital contents using said contents key;

incorporating predetermined information into said digital contents in the form of digital watermarking prior to the encrypting;

creating a digital signature for association with the encrypted digital contents;

generating a first message identifier associated with the first logic scheme; and associating said digital signature, said first logic scheme and said first message identifier with said at least partially encrypted digital contents.

17. The method according to claim 16 wherein the converting step comprises the steps of:

managing said first message identifier of said at least partially encrypted digital contents;

generating a second message identifier associated with the second logic scheme; and generating said second logic scheme in accordance with specifications transmitted from the distribution center.

18. The method according to claim 17 wherein said second logic scheme comprises:

verifying the digital signature of said encrypted digital contents;

verifying said second message identifier;

deciding whether said generated contents key is stored in said second logic scheme; and decrypting said digital contents with said contents key if said contents key is stored in said second logic scheme.

19. The method of claim 12, wherein the conversion instructions include instructions for embedding user information into the digital contents using digital watermarking consistent with the second logic scheme.

20. The method of claim 12 wherein the second logic scheme permits a different degree of access of the user terminal to the digital contents than the first logic scheme.

* * * * *